March 14, 1961     O. GROSS ET AL     2,975,144
CATALYST FOR PRODUCTION OF HYDROCYANIC ACID
Filed March 11, 1953
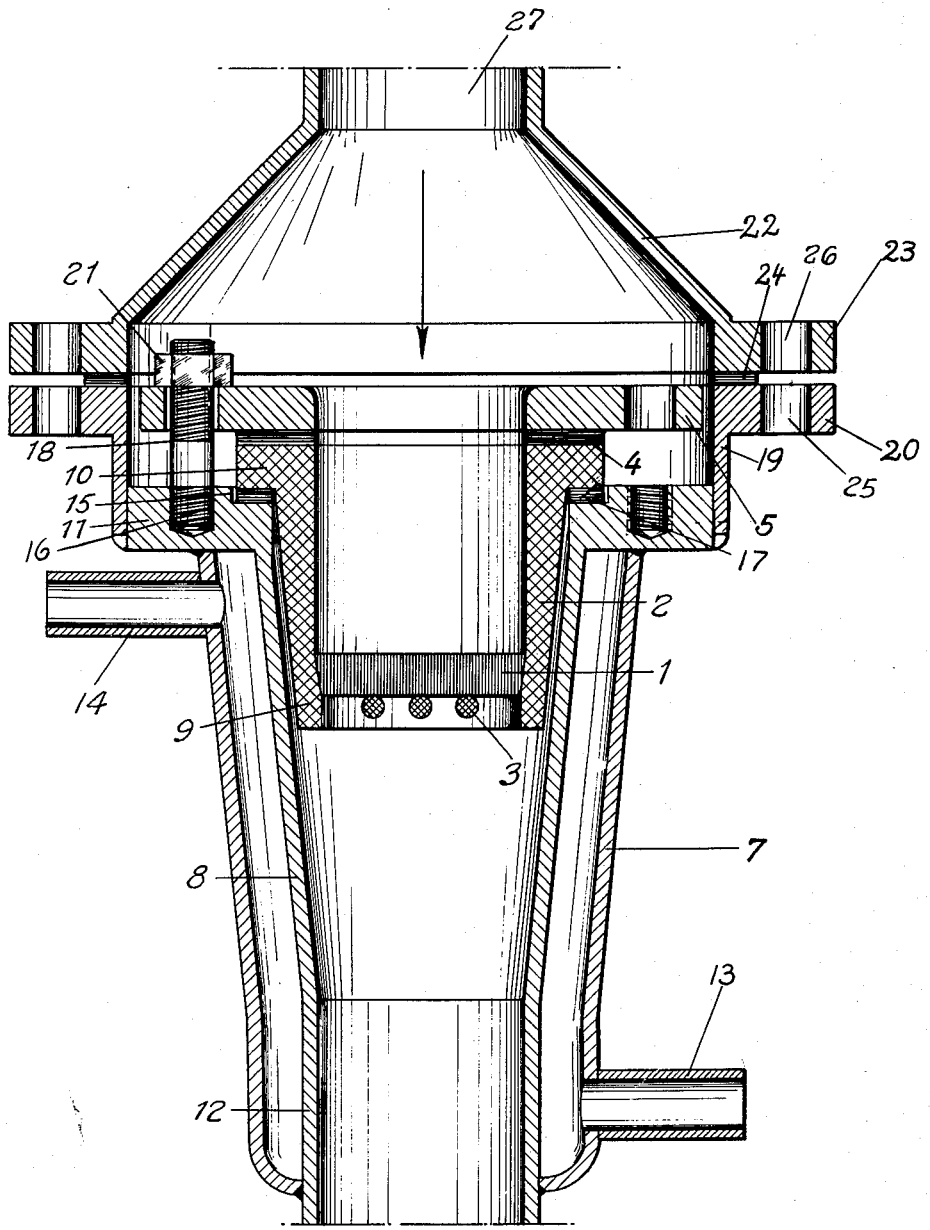
Inventors
Otto Gross + Heinz Berger
by
Attorney

# United States Patent Office 2,975,144
Patented Mar. 14, 1961

2,975,144
CATALYST FOR PRODUCTION OF HYDROCYANIC ACID

Otto Gross, Wanne-Eickel, and Heinz Berger, Herne, Germany, assignors to Bergwerkgesellschaft Hibernia Aktiengesellschaft, Wanne-Eickel, Germany, a corporation of Germany Filed Mar. 11, 1953, Ser. No. 341,685

Claims priority, application Germany Mar. 24, 1952

3 Claims. (Cl. 252—477)

This invention relates to a method of and an apparatus for making hydrogen cyanide and more particularly to a method of and an apparatus for making hydrogen cyanide from methane and other hydrocarbons.

It is known to produce hydrogen cyanide by reacting methane or other hydrocarbons at elevated temperature in the presence of suitable catalysts with ammonia and air or other oxygen containing gases. Catalysts which are employed in the catalytic oxidation of ammonia to nitrogen oxides are considered as being especially suitable for such hydrogen cyanide formation. Such catalysts are composed of platinum or other platinum metals or alloys of such platinum metals.

Hydrogen cyanide formation according to this process proceeds mainly according to the following 2 reaction equations:

(1) $NH_3 + 1.5O_2 + CH_4 = HCN + 3H_2O + 113.6$ kg. cal.
(2) $NH_3 + CH_4 = HCN + 3H_2 - 61.3$ kg. cal.

Reacting the pure or highly concentrated gases in stoichiometric proportion according to Equation 1 is accompanied by such an increase in reaction temperature that the catalyst will melt and the reaction components will decompose. Therefore inert gases, such as nitrogen, are preferably admixed to the reaction components to cause reduction of the reaction temperature. It has also been suggested to use an insufficient amount of oxygen, thus, causing the reaction partly to proceed according to heat consuming Equation 2.

When working according to Equation 1 and even more so when simultaneously working according to Equations 1 and 2, a reducing atmosphere is present in the reaction chamber and, due to said reducing atmosphere, side-reactions take place. Such side-reactions give rise to the formation of unsaturated hydrocarbons and to the deposition of carbon. Such deposited carbon, however, forms alloys with platinum and other platinum metals. Carbon alloys of platinum metals, however, are greatly impaired in their mechanical strength. Thus, carbon deposition causes rapid mechanical disintegration of the catalyst. Carbon deposition and, due thereto, disintegration of catalysts as they are conventionally used in the form of gauze or net-like structures, occur chiefly at the colder parts of the catalyst, i.e., for instance, at those places where the catalyst is tightly held between two flanges. At such places only a small amount of the reaction gas mixture will come in contact with the catalyst and the catalyst is consequently cooled due to greater heat dissipation and to loss of heat by radiation. Therefore, it has been suggested to introduce an excess of oxygen at those places where the catalyst is suspended or firmly held in position, said excess of oxygen creating an oxidizing atmosphere. It has been found, however, that it is very difficult to properly and satisfactorily regulate and control the supply of oxygen and oxygen containing gases. The composition of the reaction gas mixture varies considerably and it is almost impossible to maintain the required optimum gas composition during the reaction. Consequently a considerable decrease in yield is the result.

It is one object of this invention to provide a method of making hydrogen cyanide by reacting methane or other hydrocarbons with ammonia and oxygen or oxygen containing gases in the presence of a platinum metal catalyst whereby all the above mentioned disadvantages of the heretofore used processes and especially the occurrence of undesired side-reactions, of carbon deposition, and of premature disintegration of the catalyst are avoided, optimum reaction conditions can be maintained, and optimum yields are achieved.

Another object of this invention is to provide an apparatus for making hydrogen cyanide by reacting methane or other hydrocarbons with ammonia and oxygen or oxygen containing gases in the presence of a platinum metal catalyst, said apparatus being constructed in such a manner that the catalyst temperature in said apparatus is everywhere as uniform as possible and that heat dissipation and loss of heat due to radiation by contact of said catalyst with heat conductive holders, clamps and the like are avoided.

Other objects of this invention and certain advantageous features thereof will appear as the description proceeds.

The present invention consists, in principle, in the special manner in which the catalyst is arranged in the reaction chamber. To avoid all the drawbacks pointed out above and other disadvantages as they will be discussed hereinafter, the catalyst is not clamped or otherwise fastened at its lateral borders as in the apparatus used heretofore but is supported by and rests upon a non-metallic, substantially non-heat conductive, but heat resistant carrier and/or is confined or bordered by such non-metallic, substantially non-heat conductive, but heat resistant material and is freely accessible in such position. The catalyst is preferably provided in the form of gauze or a net-like structure and consists of metals of the platinum group or their alloys. When selecting form and structure of the catalyst, care must be taken that the reaction gas mixture will uniformly contact all parts of the catalyst so that the temperature of catalyst and reaction mixture is at any place in the reaction chamber as uniform as possible. Any contact of the catalyst with metallic elements or parts of the apparatus must be avoided. Otherwise spots and places where the catalyst is in contact with such metallic parts will have a substantially lower temperature than the mean catalyst temperature. Such differences in catalyst temperature, however, will result, at said low temperature spots and places, in carbon deposition and, thus, in lower yields.

Any metallic contact of the catalyst and any metallic parts will cause considerable heat dissipation and, as a result thereof, considerable lowering of the reaction temperature and deposition of carbon. Furthermore, with such metallic bordering parts, supports and the like, there always exists the danger that such metals will form alloys with the catalyst in the strongly reducing atmosphere and, thus, will considerably reduce its efficiency. Metallic bordering parts, supports and the like affect the reaction mixture also catalytically inasmuch as the yield of hydrogen cyanide is considerably decreased in comparison with the yield ordinarily achieved with catalysts of the platinum metal group.

Catalysts of the platinum metal group as used in the process according to the present invention, are preferably, as stated above, of the same form and composition as those employed in the catalytic oxidation of ammonia to nitrogen oxides, i.e. they consist, for instance, of pure platinum or of platinum which is alloyed with up to 10% of rhodium. Rhenium, other platinum metals, such as iridium, ruthenium, rhodium, palladium, osmium, and other alloys of said metals may also be used. A platinum alloy containing 10% of rhodium, however, has proved to be especially advantageous.

The catalyst is preferably provided in the form of gauze as it is used in the oxidation of ammonia. Such catalyst gauze has, for instance, a wire thickness of about 0.06 mm. It is, however, more advantageous to use considerably thicker wires or threads of such gauze, for instance, wires of a thickness of about 0.16 mm. and 0.20 mm. It is furthermore advisable to place several layers of such catalyst gauzes one over the other. This arrangement permits the use of a higher velocity of the reaction gases and, consequently, considerably lessens the danger of backfiring in the gas mixture. It is also very advantageous to employ so-called band or coil contact catalysts, i.e. catalysts which are obtained on spirally winding up a thin corrugated platinum foil having a width of, for instance, 3 mm. to 12 mm. so that a round sieve-like body is formed the openings of which correspond to the depth of the grooves in said corrugated foil. One may also simultaneously wind up two platinum or the like foils the one of said foils being corrugated and the other one being smooth. After winding up said foils, the spiral catalyst body is radially welded together in one or several directions so that it does not unroll any more.

Catalysts of the above mentioned composition and form are placed, according to the present invention, for instance, into a quartz tube. The lower part of said quarts tube is slightly conically formed. The catalyst rests upon said conical part and fits the opening of said quartz tube so that the space between catalyst and inner tube wall is not larger than the openings in the catalyst itself. Preferably the quartz tube is provided with a quartz grate which supports the catalyst.

The non-metallic, non-heat conductive, but heat resistant material supporting and bordering the catalyst in the reaction chamber is preferably composed of ceramic material, especially of pure silicic acid in the form of quartz, and pure aluminum oxide in the form of sintered corundum. But any other non-metallic, non-heat conductive, but heat resistant material may be used likewise, provided it retains its shape at temperatures between 1200° C. and 1300° C. and is not affected by the gases participating in the reaction.

Furthermore, it has been found to be of advantage to arrange the catalyst, according to the present invention, in such a manner in the reaction chamber that the ceramic carrier carrying said catalyst is fastened to said chamber only at one place, for instance, between two metallic flanges thereby forming a gas-tight connection between said carrier and said reaction chamber. In this way mechanical straining of the ceramic material is reduced to the lowest possible extent and any thermal stress in the apparatus and/or strain due to other causes are absorbed by the metallic parts of the apparatus. The apparatus is, of course, designed in such a manner that, even if the ceramic carrier completely breaks and cracks, no reaction gases some of which are very toxic will escape therefrom.

A preferred embodiment of an apparatus according to this invention is illustrated in the accompanying drawing. Said embodiment of the invention, however, should be construed as an example only and not at all as indicative of structural limitations. The apparatus may be varied in detail and in general design in accordance with the principles set forth herein and in the claims annexed hereto.

The reaction chamber is shown in the drawing in cross-sectional view. Catalyst 1 is placed in the slightly conical part 9 of tubular quartz carrier 2 serving as catalyst carrier in such a manner that it fits snugly the walls of said conical part 9. The catalyst in the drawing is a band contact catalyst consisting of two spirally wound foils of a platinum-rhodium alloy containing about 10% of rhodium. The foils are about 0.02 mm. thick and have a width of about 10 mm. One of said foils is smooth while the other one is corrugated with grooves that are about 0.5 mm. deep. Said spirally wound up foils are enclosed by a corrugated foil to avoid smooth contact between said catalyst 1 and the inner wall of conical part 9 of quartz carrier 2. The wound up foils are firmly connected with each other by radial welding so as to impart greater stability and strength thereto. Quartz grate 3 is provided in tubular quartz carrier 2 near its exit opening. Said quartz grate 3 serves as support for catalyst 1. Quartz carrier 2 is provided with flange 10 of the same material. Quartz carrier 2 and catalyst 1 are enclosed by tubular casing 8 which is also slightly conically shaped and has a gas exit part 12. Casing 8 and gas exit part 12 are surrounded by cylindrical jacket 7 forming a cooling space between jacket 7 and casing 8 and gas exit part 12. Jacket 7 has openings 13 and 14 for the introduction and the discharge of cooling agent and serves to cool the reaction gases after their passage through the catalyst. Instead of cooling the reaction gases by means of water, one may pass the cold gas mixture before introducing the same into the reaction chamber through said cooling jacket. Thereby the gas mixture to be reacted is heated while the reacted gases are cooled. Casing 8 is provided at its upper end with flange 11. Said flange is provided with a circular recess 15 at its uppermost inner wall, said recess being slightly larger than flange 10 of quartz carrier 2. Flange 11 is also provided with threaded holes 16 to receive stud bolts 18. Firmly attached to said flange 11 is cylindrical part 19 provided with flange 20. Into circular recess 15 of flange 11 there is placed an annular gasket 17 consisting of high-quality asbestos. Flange 10 of catalyst carrier 2 rests upon said gasket 17. A second annular gasket 4 of high-quality asbestos is placed on the upper face of said flange 10, and flange 5 provided with a hole for screw 18 is placed upon said second annular gasket 4. By tightening nuts 21 upon stud bolts 18 a gas-tight connection between casing 8 and catalyst carrier 2 is achieved. Said gas-tight connection remains unaffected even if grate 3, catalyst 1 and the conical part 9 of catalyst carrier 2 should break and be completely destroyed. Cover 22, provided with flange 23, is placed upon flange 20 of casing 8 and is gas-tightly connected with said casing 8 by means of packing 24 and double nutted bolts which pass through holes 25 and 26 in flanges 20 and 23 respectively. Said cover 22 has an upper opening 27 through which the gases to be reacted enter the reaction chamber formed by said cover 22 and casing 8.

In the operation of such an apparatus as described above and illustrated in the drawing, a gas mixture, for instance of 42% of methane, 25% of ammonia, and 33% of oxygen enters cover 22 through opening 27 after it was heated to a temperature of about 100° C. by passing through the cooling space formed by jacket 7 and casing 8. The pressure of the gas mixture is about atmospheric pressure. The gases are ignited on passing through catalyst 1 and the feed rate is adjusted so as to maintain a catalyst temperature between about 1200° C. and about 1300° C. The feed rate for a catalyst as described above having a diameter of 50 mm. is about 1 m.$^3$ per minute. The reacted gases are then cooled to a temperature of about 900° C. on passing through casing 8. They are worked up in the usual manner whereby, for instance, ammonia is selectively dissolved in hot 6% sulfuric acid and hydrogen cyanide is absorbed in cold water.

Other hydrocarbons than methane may, of course, also be used. They require usually more oxygen. Furthermore, the process may be carried out at any pressure, i.e. at atmospheric, super-atmospheric or reduced pressure. It is not necessary to use pure hydrocarbons for this reaction. A mixture of hydrocarbons may also be employed. Natural gas mixtures which are rich in lower saturated hydrocarbons are especially suitable starting materials for the purposes of this invention. In practicing this process of making hydrogen cyanide conventional gas mixtures, reaction conditions, and methods of working up the combustion products are employed and need not be described herein in detail. By the characteristic feature of this invention, namely by taking care that the platinum metal catalyst at no place in the reactor is capable of attaining a lower temperature than its mean temperature, the life of said catalyst is prolonged 50 to 100 times and the yield is increased 10% to 30% over the yield obtained under comparable conditions.

Furthermore, it was found that the effective life of the catalyst can be prolonged still further when using specific catalysts which differ from the conventional ammonia oxidation catalysts as well as from the band or coil catalysts described above in the following respects. The platinum-rhodium band or foil has a greater thickness than 0.02 mm. Its thickness is preferably between 0.04 and 0.10 mm. Although, by increasing the thickness of the catalyst foil, the catalytically effective surface per unit of weight of platinum metal or alloy and, consequently, its catalytic power are reduced, the effective life of the catalyst is increased many times. In order to react sufficient quantities of the gas mixture per given cross section of the apparatus with such a catalyst and to increase its effectiveness, it is advisable to increase the width of said catalyst bands or foils. Another very effective way of achieving this end consists in superimposing several catalyst coils made of bands or foils of a smaller width than 10 mm. to 12 mm. as used in the above described catalyst coil. Thus, in place of one single contact catalyst made of platinum foil having a width of, for instance, 12 mm., it is more expedient to use several contact catalysts made from foils having a substantially smaller width and to place two or more of such coils one upon the other in the reaction chamber. One may use, for instance, two superimposed catalyst coils made from foils of a width of 6 mm. each, or three of such coils made from foils of a width of 4 mm. each. Surprisingly it was found that subdividing the height of a catalyst coil in the reaction chamber so as to provide two or more catalyst coils which together are of the same height as the not subdivided coil, produces much better catalytic effects, i.e. gives higher yields of hydrocyanic acid than obtainable with one single not subdivided catalyst coil. Another means of increasing the effectiveness of the catalyst consists in increasing the total height of the contact catalyst coils, for instance from between 10 mm. and 12 mm. to 24 mm. or even to 30 mm. Thereby the throughput and, consequently, the yield of hydrocyanic acid per time unit are considerably increased.

As described above, corrugated platinum and the like bands or foils are spirally wound up to coils forming the contact catalyst. Preferably these catalysts consist of two foils of which only one is corrugated while the other is smooth. When using the above mentioned catalysts of smaller width best results are obtained, for instance, when using a foil of a thickness of 0.06 mm., by making the grooves of such corrugations of a depth of about 0.7 mm. and the distance between the deepest point of two neighboring grooves about 1.2 mm. The best composition of such a band or foil is a composition of platinum metal alloys having a rhodium content exceeding 10% of rhodium, said alloys preferably containing about 20% of rhodium. Contacts of this type, i.e. of a thickness exceeding 0.02 mm. and preferably of a thickness between 0.04 mm. and 0.10 mm. which contain preferably more than 10% of rhodium and preferably about 20% of rhodium have a surprisingly high effective life. They can be used with great advantage at a temperature above 1200° C. and preferably between 1200° and 1400° C., i.e. at temperatures whereby the highest yield of hydrocyanic acid is achieved and whereby the absorption of carbon from the reaction gases is very slight so that the catalyst does not become brittle. Hence, catalysts of this type which are fundamentally different from catalysts as they are conventionally used in the oxidation of ammonia to nitrogen oxides, are surprisingly effective, have a considerably prolonged life, and possess other advantages as pointed out above.

We claim:

1. A catalyst for the production of hydrocyanic acid by catalytic reaction, in the vapor phase, of ammonia, a hydrocarbon, and an oxygen containing gas, said catalyst being substantially composed of platinum metals and being used in the form of contact catalyst coils obtained by spirally winding nonperforated foils of platinum metals of which at least one is corrugated to form a catalyst coil, said foils having a thickness exceeding 0.02 mm. said catalyst consisting of several catalyst coils superimposed over each other.

2. A catalyst according to claim 1, wherein the platinum metal is a platinum metal alloy containing more than 10% of rhodium.

3. A catalyst according to claim 2, wherein the platinum metal alloy is an alloy containing about 20% of rhodium.

References Cited in the file of this patent

UNITED STATES PATENTS

| | | |
|---|---|---|
| 1,400,204 | Backhaus | Dec. 13, 1921 |
| 1,850,316 | Davis | Mar. 22, 1932 |
| 1,896,286 | Burns et al. | Feb. 7, 1933 |
| 1,923,865 | Handforth | Aug. 22, 1933 |
| 1,927,508 | Titlestad et al. | Sept. 19, 1933 |
| 1,957,749 | Andrussow et al. | May 8, 1934 |
| 2,045,632 | Colby | June 30, 1936 |
| 2,330,539 | Auchter | Sept. 28, 1943 |
| 2,357,570 | Adams | Sept. 5, 1944 |
| 2,584,080 | Houpt | Jan. 29, 1952 |
| 2,740,762 | Earley | Apr. 3, 1956 |
| 2,832,675 | Radke | Apr. 29, 1958 |

FOREIGN PATENTS

| | | |
|---|---|---|
| 527,401 | France | July 25, 1921 |